Patented Oct. 31, 1933

1,932,661

UNITED STATES PATENT OFFICE 1,932,661

ARTIFICIAL DISPERSION OF PLASTIC MATERIALS

Ralph T. Halstead, Naugatuck, Conn., assignor, by mesne assignments, to Dispersions Process, Inc., New York, N. Y., a corporation of Delaware No Drawing. Application May 15, 1930
Serial No. 452,820

7 Claims. (Cl. 134—17)

This invention relates to improvements in the production of artificial dispersions of rubber or rubber-like materials, more particularly to processes of controlling the viscosity of the same by the use during the dispersing operation of a combination of soaps having predetermined characteristics. It also relates to the products of such treatment.

In the preparation of artificial dispersions of rubber, the rubber is first softened as by milling with or without the aid of a softening agent and then dispersed into very small particles in a watery solution in the presence of a hydrophilic colloid. Generally, as a result the stability and viscosity of the final product is not well gauged; often it is less than that desired. This condition has required the additional use of thickening agents such as gums, clays, soaps, glues, and additional stabilizing agents. Where soaps have been used as dispersing agents they are used in excess of the quantity necessary to produce a stable dispersion either during the dispersing operation or after the dispersion has been formed, and as a rule have taken the form of a single soap component. In many instances where high stability has been sought this has been accompanied by low viscosity and where high viscosity has been sought for, there has resulted low stability. Again in the use of compounding ingredients such as zinc oxide which have an unstabilizing influence on the dispersion, the stability has suffered heretofore where soaps have been used. Also generally where the solid content of the dispersion has been low there has been an accompanying low viscosity and as a result when the dispersion is spread on fabrics it would tend to penetrate or strike through the fabric.

An object of this invention is to provide a process of controlling the viscosity of artificial dispersions in their preparation, without the necessity of using an excess of hydrophilic colloid. Another object is to provide an artificial dispersion of rubber of predetermined viscosity having the desired stability and rubber content. Another object is to provide an artificial dispersion having a relatively low solid content but an increased viscosity. Further objects will be apparent from the following detailed description.

Accordingly the invention comprises broadly using in the dispersing operation a combination of soaps having predetermined viscosity and hydration characteristics. Those water soluble soaps falling into either of the two following classes are used in this invention: (A) those soaps possessing a relatively low degree of hydrolysis in aqueous solution. Such aqueous solutions show little if any tendency to develop gel structures upon standing at concentrations of approximately 5% soap (by weight), but possess relatively low viscosities which are interpreted as indicating a relatively low degree of hydration for soaps of this type; and (B) those soaps possessing a relatively high degree of hydrolysis in aqueous solution. Such aqueous solutions are relatively viscous, due to a pronounced tendency on the part of the soaps to form gel structures upon standing at concentrations of approximately 5% soap (by weight), and so are regarded as having a relatively high degree of hydration.

In this invention the mixture of soaps comprises at least one member from each class. If alkali-metal soaps such as sodium soaps are considered; class A is typified by such as sodium abietate, sodium rosinate and sodium oleate, while class B is typified by such as sodium palmitate and sodium stearate.

The determination of the character of the component soaps may be made by establishing the gel forming capacities of 5% solutions and by hydrolysis measurements of these same solutions at various dilutions. A class A soap will have relatively low gel-forming characteristics as indicated above and a degree of hydrolysis less than that of a class B soap. The latter, on the other hand, will show a gel structure in a 5% solution when allowed to stand, and will have a degree of hydrolysis greater than that of the class A component.

The soaps of class A are essentially stabilizing elements in the dispersion while those of class B are essentially viscosity-conferring elements. Class A component when used with class B component increases the ease with which a charge may be dispersed and tends to induce an earlier inversion of the phases, that is, to create a condition where water is the continuous phase, than is secured when a class B soap alone is used. It is preferred to add the acids corresponding to the soaps selected from class A and B to the rubber in the mixer prior to conversion into an aqueous dispersion. In such a case the plasticized mixture which has been blended and softened on a mill, for instance, is added to a mixer of the Werner and Pfleiderer type and the acids then added thereto with mixing. The acids may, if desired, be blended with the rubber either during or at the end of the plasticizing operation on the rubber. Then alkali, for example, sodium hydroxide—where sodium soaps are to be formed —is introduced into the charge and water gradually added during the mixing until the rubber ceases to be the continuous phase and becomes finely dispersed in the watery solution.

More specifically, the rubber compound is milled preferably on a cold mill until thoroughly broken down. The period of milling will vary being approximately 90 min. for crude stock and somewhat less for reclaimed stock. Having thoroughly plasticized the rubber it is introduced into a heated mixer and while being mixed one shot of water is added. The supplied heat is turned off of the mixer and the charge allowed to heat under its own heat of friction at which time the acids are added to the charge. When these have been thoroughly worked into the rubber mass two shots of water are added at intervals and, after this has disappeared into the rubber mass, the caustic is added. The mixer is again heated by means of steam for a period of fifteen or twenty minutes, the steam turned off and the mixer allowed to run under its own heat of friction for an additional fifteen or twenty minutes and, finally, cold water is circulated through the walls of the mixer in an effort to chill the charge as much as possible. Further shots of water are added at intervals until the charge has gradually taken up so much water that it at length inverts to the water phase. Further additions of water are made without difficulty in diluting to the desired solids content. A shot as above referred to is about 28 cc. of water to every 700 grams of rubber.

The composition of the mixture of organic acids added will determine the viscosity of the final product, which viscosity may be increased or decreased at will throughout an appreciable range, depending on the quantitative selection from classes A and B. Due to an apparent fortifying action in which one soap appears to enhance the protective colloidal properties of the other, such soap mixtures are more efficient protective colloids than any of the component soaps when used alone. The advantages of the combination of soaps are many. For example when smoked sheet was dispersed with the aid of 10% rosin which is saponified with sodium hydroxide, the resulting dispersion had a viscosity which permitted a ready flow even when the solids content was maintained at 45 to 50%. Such a dispersion had a satisfactory stability. When a second dispersion was made duplicating the first in all respects except that the 10% rosin was replaced by 10% stearic acid, this dispersion had a viscosity sufficient to prevent ready flow in samples having a solids content of 30% to 35%. The stability of this dispersion was also satisfactory due, in no small measure, to its enhanced viscosity. When a comparison of stability for these two dispersions was made between samples containing the same solids content, their relative stabilities were practically identical; however, when such a comparison was made between samples having the same viscosity, the stability of the one containing rosin soaps was found to be superior to that of the one containing sodium stearate.

By using a mixture of these two soaps, e. g. 5% rosinate and 5% stearate, a dispersion of smoked sheet was obtained having a viscosity even higher than that of the 10% stearic acid run and having a stability superior to that of the 10% rosin run when compared at the same solids content and equal to it when the comparison was made between samples having equal viscosities. The detailed composition of such a dispersion which has actually been successfully prepared follows:

| | Grams |
|---|---|
| Smoked sheet, milled for 90 minutes | 700 |
| Rosin | 35 |
| Stearic acid | 35 |
| Sodium hydroxide | 9.5 |

A second and still more illuminating example of the enhanced efficiency of soap mixtures over the normal efficiency of the single soap component is found in the case of dispersions containing zinc oxide. A reclaim stock, into which was milled 6% zinc oxide, was found to disperse satisfactorily on 7.5% rosin saponified with sodium hydroxide, but normally gave a low viscosity product. It was found impossible to disperse the same compounded stock on even as much as 10% stearic acid, due to the effect of the zinc oxide. However, a mixture of 4% rosin and 3.5% stearic acid proved the basis of an excellent dispersing agent, yielding a dispersion with a stability at least equal to that of the 7.5% rosin sample and with a viscosity so high that a sample with 45% solids flowed only very slightly. The composition of such a dispersion which has actually been prepared and found as described above is as follows:

800 grams reclaim; milled for 50 minutes during the latter half of which is added: 48 grams zinc oxide and 8 grams of the reaction product of acetone and diphenylamine. This charge is dispersed on

| | Grams |
|---|---|
| Rosin | 32 |
| Stearic acid | 29 |
| Sodium hydroxide | 10 |

The beneficial action of a soap mixture in effecting the production of a stable dispersion which could not be secured by using equivalent amounts of the component soaps alone was shown by the following series:

Zinc oxide, which is recognized as a compounding ingredient that tends to reduce the stability of crude rubber dispersions, was milled into a smoked sheet stock. This stock, containing 10% zinc oxide could not be dispersed upon 10% rosinate soap, 10% stearate soap nor upon intermediate mixtures of these two to give a total mixed soap content of 10%. An attempt to disperse this stock on 15% rosinate soap met with no success. When 15% stearate was employed, the charge dispersed but the dispersion was of very poor grade. However, a mixture of 5% stearate soap plus 10% rosinate soap resulted not only in the dispersion of the mass but the production of a stable, smooth, relatively viscous product. The actual composition of this run is as follows:

700 grams smoked sheet, milled for 90 min. during the latter half of which is added 70 grams zinc oxide. The charge is then dispersed on

| | Grams |
|---|---|
| Stearic acid | 35 |
| Rosin | 70 |
| Sodium hydroxide | 14.25 |

Instead of forming the soaps in situ, a suitable mixture of the already prepared soaps may be mixed with the plasticized rubber compound, preferably in substantially dry condition at the point in the process where the corresponding acids would ordinarily be added to the rubber.

Practical uses for the invention are:

(a) To increase the viscosity of dispersions in order to facilitate spreading the latter upon cloth.

(b) To increase the viscosity of dispersions in order to prevent penetration of the latter through a cloth or fabric which is being coated or treated on one side only.

(c) To increase the viscosity of dispersions and thereby obtain greater stability by retarding any tendency of the disperse phase to "cream out" in the form of a concentrated layer.

(d) To facilitate the preparation and stability of compounded dispersions, particularly those containing zinc oxide, which cannot be satisfactorily dispersed on equivalent amounts of the single component soaps.

Cellulose ester such as cellulose acetate or nitrate may be plasticized by working the same in a mixer in the presence of a plasticizer such as wood creosote and then dispersed in a non-solvent such as water with the addition of a gum such as gum tragacanth and the mixture of soaps of this invention to give the required viscosity.

The expression "organo-plastic material" includes any material of an organic nature which is either normally plasticizable as such, for instance, rubber, waxes and the like, or which can be rendered plastic as in the case of cellulose esters by the addition of plasticizers.

Various modifications may be resorted to without departing from the principle and scope of the invention, and it is not desired to limit the same otherwise than as set forth in the appended claims.

Having thus described my invention, what I claim and desire to protect by Letters Patent is:

1. A process of preparing artificial dispersions of rubber or rubber-like materials which comprises dispersing a plasticized and softened rubber stock in water in the presence of a mixture of water soluble soap from a group comprising sodium abietate, sodium rosinate, sodium oleate and water soluble soap from a group comprising sodium palmitate and sodium stearate.

2. A process of preparing artificial dispersions of rubber or rubber-like materials which comprises dispersing a plasticized and softened rubber stock containing zinc oxide in water in the presence of a mixture of water soluble soap from a group comprising sodium abietate, sodium rosinate, sodium oleate, and water soluble soap from a group comprising sodium palmitate and sodium stearate.

3. An artificial dispersion of rubber or rubber-like material in an aqueous medium containing water soluble soap from a group comprising sodium abietate, sodium rosinate, sodium oleate and water soluble soap from a group comprising sodium palmitate and sodium stearate.

4. An artificial dispersion of rubber or rubber-like materials in an aqueous medium containing zinc oxide and water soluble soap from a group comprising sodium abietate, sodium rosinate, sodium oleate and water soluble soap from a group comprising sodium palmitate and sodium stearate.

5. An artificial dispersion of rubber in an aqueous medium containing sodium rosinate and sodium stearate.

6. An artificial dispersion of rubber in an aqueous medium containing 5% sodium rosinate and 5% sodium stearate.

7. An artificial dispersion of rubber in an aqueous medium containing zinc oxide, sodium rosinate and sodium stearate.

RALPH T. HALSTEAD.